US006150462A

United States Patent [19]
Rajagopalan et al.

[11] Patent Number: 6,150,462
[45] Date of Patent: Nov. 21, 2000

[54] GOLF BALL COMPOSITIONS FORMED FROM SINGLE SITE CATALYZED POLYMERS

[75] Inventors: Murali Rajagopalan, South Dartmouth; Kevin M. Harris, New Bedford, both of Mass.

[73] Assignee: Acushnet Company, Fairhaven, Mass.

[21] Appl. No.: 09/217,703

[22] Filed: Dec. 21, 1998

Related U.S. Application Data

[63] Continuation-in-part of application No. 08/950,197, Oct. 14, 1997, Pat. No. 5,981,658, which is a continuation-in-part of application No. 08/658,338, Jun. 5, 1996, Pat. No. 5,824,746, which is a continuation-in-part of application No. 08/482,514, Jun. 7, 1995, Pat. No. 5,703,166, which is a continuation-in-part of application No. 08/377,553, Jan. 24, 1995, abandoned.

[51] Int. Cl.$^7$ ............................ A63B 37/12; A63B 37/00; C08L 23/04

[52] U.S. Cl. .............................. 525/74; 525/72; 525/221; 525/274; 525/285; 473/354; 473/355; 473/365; 473/372; 473/373; 473/374; 473/377; 473/378; 473/385

[58] Field of Search .................................. 525/72, 74, 221, 525/274, 285; 473/354, 355, 365, 372, 373, 374, 377, 378, 385

[56] References Cited

U.S. PATENT DOCUMENTS

| | | | |
|---|---|---|---|
| 3,572,722 | 3/1971 | Harrison et al. | 273/218 |
| 4,274,637 | 6/1981 | Molitor | 273/235 R |
| 4,431,193 | 2/1984 | Nesbitt | 273/235 R |
| 4,781,383 | 11/1988 | Kamada et al. | 273/228 |
| 4,884,814 | 12/1989 | Sullivan | 273/235 R |
| 5,002,281 | 3/1991 | Nakahara et al. | 273/220 |
| 5,187,013 | 2/1993 | Sullivan | 428/407 |
| 5,312,857 | 5/1994 | Sullivan | 524/400 |
| 5,321,089 | 6/1994 | Cadorniga et al. | 525/196 |
| 5,338,610 | 8/1994 | Sullivan | 428/407 |
| 5,367,028 | 11/1994 | Hamada et al. | 525/221 |
| 5,397,840 | 3/1995 | Sullivan et al. | 525/221 |
| 5,703,166 | 12/1997 | Rajagopalan et al. | 525/196 |
| 5,830,087 | 11/1998 | Sullivan . | |

FOREIGN PATENT DOCUMENTS

| | | |
|---|---|---|
| 0 633 043 A1 | 1/1995 | European Pat. Off. . |
| 2 278 609 | 12/1994 | United Kingdom . |
| WO 96/23010 | 8/1996 | WIPO . |
| 40382 | 12/1996 | WIPO . |

OTHER PUBLICATIONS

Ann M. Thayer, "Metallocene Catalysts Initiate New Era in Polymer Synthesis," Chemical & Engineering News, Sep. 11, 1995, pp. 15–20.

Sentinel Products Update, Metallocene Polyolefin Foam & Cellular Rubber, Summer 1995.

P.S. Chum et al., "Structure/Property Relationships in Polyolefins Made by Constrained Geometry Catalyst Technology," Plastics Engineering, Jun. 1995, pp. 21–23.

Jan H. Schut, "Competition for Metallocenes Could Turn Ugly," Plastics World, Jan. 1995, pp. 33–36.

Smith et al., "Applications and Advantages of Flexible Metallocene Polyolefin Foams," SPO '95, pp. 95–107.

Robert D. Leaversuch, "Metallocene Resins: Is the Revolution for Real?" Modern Plastics, Jun. 1994, pp. 48–50.

Exxon Chemical Co., "Exact Facts," Exxpol Technology, Jun. 1994 pp. 1–8.

T.C. Yu et al., "Polyolefin Modification with EXACT™ Plastomers," SPE RETEC Polyolefins VIII Conference, Feb. 1993.

Matthew H. Naitove, "Novel Rheological Behavior Claimed for New–Tech Polyolefins," Plastics Technology, Nov. 1992, pp. 23 & 25.

Leonard V. Cribbs et al., "Single–Site Olefin Polymerization Using Non–Metallocene Catalysis," ANTEC Conference, Soc. Plastic Engineering (1998).

Michael Freemantle, "New Catalysts to polymerize Olefins," C&EN, Apr. 13, 1998, pp. 11–12.

Summaries of Spring Meeting, Mar. 29–Apr. 2, 1998, Dallas Texas, Polymeric Materials Science and Engineering, vol. 78, ACS, 1998.

A. A. Montagna et al., "The evolution of single–site catalysis," Chemtech, Dec. 1997, pp. 26–31.

Maurice Brookhart et al., "New Ni(II)–Based Catalysts for the Preparation of Polyolefins," SPO '96, Schotland business research, inc., copyright 1996, pp. 119–120.

"Standard Terminology Relating to Dynamic Mechanical Measurements on Plastics," ASTM Designation: D 4092–90, pp. 539–541.

"Standard Test Method for Measuring the Dynamic Mechanical Properties of Plastics in Torsion," ASTM Designation: D 5279–93, pp. 413–415.

"Standard Practice for Determining and Reporting Dynamic Mechanical Properties of Plastics," ASTM Designation: D 4065–94, pp. 518–522.

*Primary Examiner*—David J. Buttner
*Attorney, Agent, or Firm*—Pennie & Edmonds LLP

[57] ABSTRACT

Golf ball compositions, which contain olefinic polymers produced by use of single-site catalysts. Such polymers can be functionalized with a post-polymerization reaction. The single-site catalyzed polymers may be blended with ionomers, other grafted or non-grafted single-site catalyzed polymers, thermoplastics, non-single-site polymers, or other non-ionomeric polymers. The compositions can be foamed or unfoamed. Golf balls that employ at least one layer of these compositions in any of the golf ball cover, core, or a mantle situated between the cover and the core provide ball properties and performance similar to and in some cases better than the state of the art ionomer based golf balls.

68 Claims, 2 Drawing Sheets

GOLF BALL COMPOSITIONS FORMED FROM SINGLE SITE CATALYZED POLYMERS

CROSS-REFERENCE TO RELATED APPLICATIONS

This application is a continuation-in-part of U.S. application Ser. No. 08/950,197, filed on Oct. 14, 1997, now U.S. Pat. No. 5,981,658, which is a continuation in-part of U.S. application Ser. No. 08/658,338, filed on Jun. 5, 1996, now U.S. Pat. No. 5,824,746 which is a continuation-in-part of U.S. application Ser. No. 08/482,514, filed on Jun. 7, 1995; now U.S Pat. No. 5,703,166, which is a continuation-in-part of U.S. application Ser. No. 08/377,553 filed Jan. 24, 1995 (now abandoned).

FIELD OF THE INVENTION

The present invention relates to golf ball compositions that contain non-ionic polymers produced using single-site catalysts. The polymers derived using such catalysts have narrow molecular weight distributions and uniform molecular architecture. As a result of these characteristics, golf balls comprising such polymers have improved performance characteristics, such as improved distance and better control on the green.

BACKGROUND OF THE INVENTION

Three-piece, wound golf balls with balata covers are preferred by most expert golfers. These balls provide a combination of distance, high spin rate, and control that is not available with other types of golf balls. However, balata is easily damaged in normal play, and, thus, lacks the durability required by the average golfer.

In contrast, amateur golfers typically prefer a solid, two-piece ball with an ionomer cover, which provides a combination of distance and durability. Because of the hard ionomer cover, these balls are almost impossible to cut. They also have a very hard "feel", however, which many golfers find unacceptable, and a lower spin rate, making these balls more difficult to draw or fade. The reduction in the spin rate can be attributed to the differences between three-piece, wound golf balls and solid, two-piece balls in the composition and construction of both the cover and the core.

Many attempts have been made to produce a golf ball with the control and feel of a wound balata ball and the durability of a solid, two-piece ball, but none have succeeded totally. For example, U.S. Pat. No. 4,274,637 to Molitor discloses two- and three-piece golf balls having covers completely or partially formed from a cellular polymeric material to improve backspin, but does not provide any examples that compare the spin rates of the disclosed golf balls with those of prior art balls.

U.S. Pat. No. 5,002,281 to Nakahara et al. discloses a three-piece solid golf ball having an ionomer cover and a solid core consisting of a soft inner core and a hard outer shell, where the difference in the hardness of the two parts of the core is at least 10 on the JIS-C scale.

Similarly, U.S. Pat. No. 4,781,383 discloses a solid, three-piece golf ball, having an ionomer cover and a core with inner and outer layers, where the inner layer has a diameter of 24 to 29 mm and a Shore D hardness of 15 to 30, and the outer layer has a diameter of 36 to 41 and a Shore D hardness of 55 to 65. The percentage of the ball surface which contacts the club face when the ball is struck is 27 to 35%.

European Patent Application 0 633 043 discloses a solid, three-piece golf ball with an ionomer or balata cover, a center core, and an intermediate layer. The center core has a diameter of at least 29 mm and a specific gravity of less than 1.4. The intermediate layer has a thickness of at least 1 mm, a specific gravity of less than 1.2, and a hardness of at least 85 on the JIS-C scale.

U.S. Pat. Nos. 5,703,166 and 5,824,746 to Rajagopalan et al. and Harris et al. disclose golf balls incorporating blends of ionomers and non-ionic polyolefin polymers produced by metallocene catalysts. Metallocene catalysts are transition metal complexes that have substituted or unsubstituted cyclopentadienyl groups serving as ligands. The polymers produced using metallocene catalysts have a narrow molecular weight distribution, and a uniform molecular architecture, such that the order and orientation of the monomers in the polymer, and the amount and type of branching is essentially the same in each polymer chain. However, metallocene catalysts technology is limited to the production of non-polar polymers. Single-site catalysts other than metallocenes, such as those disclosed herein, can produce both polar and non-polar polymers with unique properties, which will have a dramatic influence in golf ball performance.

A number of single-site catalysts other than metallocenes are known. Recent articles have disclosed several non-metallocene single-site catalysts. The Apr. 13, 1998 issue of Chemical and Engineering News describes a method a producing complexes of iron (II) and cobalt (II) with 2,6 bis-(imino)pyridyl ligands. These single-site catalysts reportedly produce polymers with narrow molecular weight distributions, and a uniform molecular architecture.

Similarly, Brookhart et al., at the Sixth International Business Forum on Specialty Polyolefins, September, 1996, reported a class of nickel (II) and palladium (II) complexes which serve as active catalysts for the polymerization of ethylene and α-olefins. These complexes feature a substituted α-diimine ligand. Brookhart reports that by varying, among other things, the catalyst structure the degree and type of polymer branching can be controlled.

Cribbs et al., Antec, 1998, S.P.E., discloses several single-site catalysts other than metallocene. These include diimide complexes of nickel and palladium, and complexes of 1,4,7-triazacyclononane with rhodium, chromium, and scandium. Cribbs also discloses a process for forming non-metallocene single-site catalysts that consists of deprotonating pyroles or indoles to form a monoanion, and then reacting the monoanion with $TiCl_4$ or $ZrCl_4$ to form the single-site catalysts. This catalyst, when co-catalyzed with a sizable excess of methylalumoxane, has been found to polymerize ethylene to narrow molecular weight distribution polyethylene. Cribbs also discloses boratabenzene complexes of the Group 4 or 5 metals, and reports that these complexes show good activity in ethylene polymerization and that the molecular weights of the product can be varied by changing the substituents on the boron atom.

In the December 1997 issue of Chemtech, Montagna discloses several examples of non-metallocene single-site catalysts, including the Brookhart catalyst and the McConville catalyst, which is a zirconium complex stabilized by diamide ligands.

International patent application PCT WO96/23010 discloses several additional single-site catalysts. These include transition metal complexes, typically nickel or palladium complexes, having an α-diimine ligand.

However, although single-site catalysts are known, there is no known prior art disclosure of golf balls that incorporate compositions comprising polymers produced by such single-site catalysts, other than those produced using metallocene catalysts. Therefore, there is no appreciation in the prior art of the unique advantages obtained with golf balls produced with these materials.

While a variety of blend combinations of one species of polymer, such as ionomers, have been successfully used to make golf balls in the prior art, the prior art does not disclose successful blends of different types of polymers, such as ionomers and balata or other non-ionic polymers for use in golf ball covers. In general, prior art blends of such polymer components are immiscible, i.e., heterogeneous on a microscopic scale, and incompatible, i.e., heterogeneous on a macroscopic scale, unless strong interactions are present between the polymer components in the mixture, such as those observed between ionomers and polymers containing carboxylic acid groups. In particular, this lack of compatibility exists when an ionomer is blended with a polyolefin homopolymer, copolymer, or terpolymer that does not contain ionic, acidic, basic, or other polar pendant groups, and is not produced with a single-site catalyst. These mixtures often have poor tensile strength, impact strength, and the like. Hence, the golf balls produced from these incompatible mixtures will have inferior golf ball properties such as poor durability, cut resistance, and so on. In contrast, a compatible blend may be heterogeneous on a microscopic scale, but homogeneous on a macroscopic scale, and, thus, have useful golf ball properties.

In this regard, U.S. Pat. No. 5,397,840 to Sullivan discloses golf ball covers including a blend of "ionic copolymers" and "non-ionic copolymers". However, the "ionic copolymers" are defined as copolymers of an α-olefin and a metal salt of an α,β-unsaturated carboxylic acid, and the "non-ionic copolymers" are copolymers or terpolymers containing ethylene or propylene and acrylic or methacrylic acid monomers. Therefore, strong interactions exist between the metal salts of the "ionic copolymers" and the acrylic or methacrylic acid monomers of the "non-ionic copolymers" that allow compatible blends to be formed. These interactions do not exist in prior art blends of ionomers and polymers that are truly non-ionic or non-polar, in particular, those polymers produced with a process that does not involve the use of a single-site catalysts.

U.S. Pat. Nos. 4,986,545; 5,098,105; 5,187,013; 5,330,837; and 5,338,610 to Sullivan disclose golf balls having covers comprising blends of ionomers and modified thermoplastic elastomers, where the thermoplastic elastomers are conventional polymers, i.e., polymers polymerized using catalysts other than single-site catalysts. The modified polymers include maleic anhydride modified ethylene-propylene copolymers, maleic anhydride modified styrenic block copolymers, maleic anhydride modified ethylene-vinyl acetate copolymers, brominated styrene-isobutylene copolymers, amine modified ethylene-propylene rubber, and polar modified paramethylstyrene-isobutylene copolymers. However, Sullivan does not exemplify blends of ionomers with any type of modified polyolefin, including those produced with single-site catalysts. Although the disclosed balls are said to exhibit enhanced playability, i.e., softness and spin, without sacrificing coefficient of restitution and, thus, carrying distance, all of the exemplified balls have a Riehle Compression in the range of 61 to 43, which corresponds to a PGA Compression range of from 99 to 117. Therefore, even though the disclosed cover materials may be relatively soft, each of the disclosed balls has an extremely high compression, and, thus, would be expected to have a high coefficient of restitution.

As shown in U.S. Pat. No. 5,703,166, metallocene catalyzed polymers and ionomers form compatible blends having useful golf ball properties. Co-pending application No. 08/950,197 discloses golf balls comprising grafted metallocene catalyzed polymers. However, there is no known prior art disclosure of golf balls incorporating compositions comprising grafted non-metallocene single-site catalyzed polymers.

Single-site catalyzed polymers, such as those mentioned above, may be functionalized by grafting functional groups onto the polymer chain. Processes for grafting monomers onto polymers, in particular, polyolefins, are known. European Patent Application No. 0 266 994 of P. C. Wong discloses a process for grafting ethylenically unsaturated monomers, such as unsaturated carboxylic acids and anhydrides and derivatives thereof, onto copolymers of ethylene. The disclosed process comprises the steps of forming an admixture of the copolymer, the monomer, and 25 to 3,000 ppm of an organic peroxide having a half-life of from about one minute to about 120 minutes at 150° C., and mixing the resultant admixture in an extruder at a temperature above the melting point of the copolymer for a time at least four times the half-life of the organic peroxide. The resultant grafted copolymer is then extruded into a shaped article.

U.S. Pat. No. 5,106,916 to Mitchell discloses a process for the catalytic grafting of an ethylenically unsaturated monomer onto a copolymer in which the process of EPA 0 266 994 is modified by the addition of a catalyst comprising water and at least one phosphorous-containing compound selected from the group consisting of compounds of formula HPO $(OR_1)_2$, phosphite compounds of formula $P(OR_2)_3$ and formula $(OR_3)P$—O—$R_4$—O—$P(OR_5)_2$, and disubstituted pentaerythritol diphosphites of formula $(R_6O)P$—$O_2$—$R_{PE}O_2$—$P(OR_7)$, where $O_2R_{PE}O_2$ is the pentaerythritol moiety, and $R_1$—$R_7$ are specified organic functional groups.

Therefore, there is a need in the golf ball art for a golf ball formed of one or more compositions incorporating single-site catalyzed polymers, as well as blends of single-site catalyzed polymers with other polymers, including, but not limited to, ionomers. In particular, the inclusion of foamed and unfoamed, grafted or non-grafted, single-site catalyzed polymers, and blends of such polymers will allow highly durable golf balls to be produced with improved performance and virtually any combination of feel and spin rate.

SUMMARY OF THE INVENTION

The present invention is directed to golf balls having at least one layer formed of a polymer produced using a single-site catalyst, i.e., a single-site catalyzed polymer, or a blend of such polymers and one or more other polymers, such as ionomers, non-ionomeric polymers, thermoset polymers, thermoplastics, or non-single-site polymers, where the ionomer, non-ionomeric polymer, thermoplastic, or non-single-site polymer has a flexural modulus of at least about 500 psi. Typically, the at least one single-site catalyzed polymer has a hardness of at least about 15 Shore A, preferably from about 50 Shore A to about 80 Shore D, a flexural modulus of at least about 500 psi, preferably from about 1,000 to about 100,000 psi, a specific gravity of at least about 0.7, preferably from about 0.75 to about 1, a dynamic shear storage modulus (G') at 23° C., as described in ASTM D 4092-90, ASTM D 5279-93, and ASTM D 4065-94, of at least about $10^4$ dynes/cm², preferably about $10^6$ to about $10^{10}$ dynes/cm², and most preferably from about $10^6$ to about $10^9$ dynes/cm², and a loss tangent (tan δ) of no more than about 1, preferably, no more than about 0.1, and most preferably from about 0.001 to about 0.01. The polymer may be ionic, non-ionic, polar, or non-polar. The layer, which may have a foamed structure, forms a portion of at least one of the cover, the core, or a mantle situated between the cover and the core. Preferably, the layer further comprises at least one of a density increasing filler or a density decreasing filler. Golf balls comprising such polymers have improved performance characteristics, such as improved distance and better control on the green.

Typically, golf balls of the invention have a cover having a thickness of at least about 0.03 inch, preferably from about 0.03 to about 0.125 inch, at least about 60, preferably at least about 70 percent dimple coverage, and a hardness of from about 40 to about 70 Shore D. Cores of the golf balls of the invention typically have a PGA compression of at least about 40, preferably from about 40 to about 90. Cores may be wound having a solid, gas filled, liquid filled, or hollow center that has a diameter of at least about 0.5. Optionally, the golf balls of the invention may also have a mantle situated between the cover and the core having a thickness of at least about 0.02 inch. Where the mantle is present, the core typically has a diameter of less than about 1.6 inches. The mantle may be formed from any material known in the art, including a layer formed from a wound elastomeric material. Where the layer forms at least a portion of the mantle, the mantle layer typically has a thickness of from about 0.02 to about 0.125 inch and a hardness of at least about 15 Shore D. The PGA compression of golf balls of the invention is typically in the range of from about 60 to about 120.

The present invention is generally directed in a first embodiment to golf ball compositions that comprise at least one single-site catalyzed polymer having the formula:

wherein

R$_1$ is hydrogen;

R$_2$ is hydrogen or lower alkyl selected from the group; consisting of CH$_3$, C$_2$H$_5$, C$_3$H$_7$, C$_4$H$_9$, and C$_5$H$_{11}$;

R$_3$ is hydrogen or lower alkyl selected from the group consisting of CH$_3$, C$_2$H$_5$, C$_3$H$_7$, C$_4$H$_9$, and C$_5$H$_{11}$;

R$_4$ is selected from the group consisting of H, CH$_3$, C$_2$H$_5$, C$_3$H$_7$, C$_4$H$_9$, C$_5$H$_{11}$, C$_6$H$_{13}$, C$_7$H$_{15}$, C$_8$H$_{17}$, C$_9$H$_{19}$, C$_{10}$H$_{21}$, and phenyl, in which from 0 to 5 H within R$_4$ can be replaced by substituents selected from the group consisting of COOH, SO$_3$H, NH$_2$, F, Cl, Br, I, OH, SH, epoxy, isocyanate, silicone, lower alkyl esters and lower alkyl ethers, with the proviso that R$_3$ and R$_4$ can be combined to form a bicyclic ring;

R$_5$ is hydrogen, lower alkyl including C$_1$–C$_5$, carbocyclic, aromatic or heterocyclic;

R$_6$ is hydrogen, lower alkyl including C$_1$–C$_5$, carbocyclic, aromatic or heterocyclic; and wherein x ranges from 100 to 50 weight per cent of the polymer, y ranges from 0 to 50 weight per cent of the polymer and z ranges from 0 to 49 weight per cent of the polymer.

The present invention is further directed in a second embodiment to golf balls having at least one foamed or unfoamed layer in at least one of the cover, the core, or in one or more intermediate mantles between the cover and the core, where the layer is formed from a composition comprising at least one single-site catalyzed polymer having a hardness of at least about 15 Shore A, a flexural modulus of at least about 500, and a specific gravity of at least about 0.7, that has optionally been functionalized by sulfonation, carboxylation, addition of an amine, hydroxy, epoxy, or isocyanate, or by grafting an ethylenically unsaturated monomer onto the at least one single-site catalyzed polymer using a post-polymerization reaction. The ethylenically unsaturated monomer is typically an olefinic monomer having a functional group selected from the group consisting of sulfonic acid, sulfonic acid derivatives, chlorosulfonic acid, vinyl ethers, vinyl esters, primary amines, secondary amines, tertiary amines, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, epoxy, isocyanate, and ionomeric derivatives thereof. Preferably, the ethylenically unsaturated monomer is maleic anhydride.

Grafted single-site catalyzed polymers share the advantages of non-grafted single-site catalyzed polymers, including a narrow molecular weight distribution and uniform molecular architecture. The addition of functional groups to the single-site catalyzed polymers by grafting allows polymers to be produced having properties that are not available with unfunctionalized single-site catalyzed polymers or polymers formed without the use of single-site catalysts.

Preferably, the grafted single-site catalyzed polymer is formed by grafting an ethylenically unsaturated monomer onto a single-site catalyzed polymer selected from the group consisting of polyethylene, polypropylene, and copolymers of ethylene with propylene, butene, pentene, hexene, heptene, octene, and norbornene, most preferably, copolymers of ethylene with butene, pentene, hexene, heptene, octene, and norbornene, but may be formed by grafting an ethylenically unsaturated monomer onto any single-site catalyzed polymer of the formula:

wherein

R$_1$ is hydrogen;

R$_2$ is hydrogen or lower alkyl selected from the group consisting of CH$_3$, C$_2$H$_5$, C$_3$H$_7$, C$_4$H$_9$, and C$_5$H$_{11}$;

R$_3$ is hydrogen or lower alkyl selected from the group consisting of CH$_3$, C$_2$H$_5$, C$_3$H$_7$, C$_4$H$_9$, and C$_5$H$_{11}$;

R$_4$ is selected from the group consisting of H, CH$_3$, C$_2$H$_5$, C$_3$H$_7$, C$_4$H$_9$, C$_5$H$_{11}$, C$_6$H$_{13}$, C$_7$H$_{15}$, C$_8$H$_{17}$, C$_9$H$_{19}$, C$_{10}$H$_{21}$, and phenyl, in which from 0 to 5 H within R$_4$ can be replaced by substituents selected from the group consisting of COOH, SO$_3$H, NH$_2$, F, Cl, Br, I, OH, SH, silicone, lower alkyl esters and lower alkyl ethers, with the proviso that R$_3$ and R$_4$ can be combined to form a bicyclic ring;

R$_5$ is hydrogen, lower alkyl including C$_1$–C$_5$, carbocyclic, aromatic or heterocyclic;

R$_6$ is hydrogen, lower alkyl including C$_1$–C$_5$, carbocyclic, aromatic or heterocyclic; and wherein x ranges from 100 to 50 weight per cent of the polymer, y ranges from 0 to 50 weight per cent of the polymer and z ranges from 0 to 49 weight per cent of the polymer.

The golf ball compositions of the invention may comprise a blend of at least one single-site catalyzed polymer, which may be functionalized, and at least one of an ionomer, a non-grafted single-site catalyzed polymer, a grafted single-site catalyzed polymer, or a non-ionomeric polymer. Any of the cover, the core, or a mantle between the cover and the core may further comprise a density increasing or decreasing filler material.

DETAILED DESCRIPTION OF THE INVENTION

As used herein, the term "single-site catalyst" refers to a catalyst which contains an ancillary ligand or ligands that influences the stearic and electronic characteristics of the polymerizing site in a manner that prevents formation of secondary polymerizing species. The term "metallocene catalyst" refers to a single-site catalyst wherein the ancillary ligands are comprising substituted or unsubstituted cyclopentadienyl groups, and the term "non-metallocene catalyst" refers to a single-site catalyst other than a metallocene catalyst.

Non-metallocene single-site catalysts include, but are not limited to, the Brookhart catalyst, which has the following structure:

wherein M is nickel or palladium, R and R' are independently hydrogen, hydrocarbyl, or substituted hydrocarbyl, Ar is $(CF_3)_2C_6H_3$, and X is alkyl, methyl, hydride, or halide, i.e., chloride, bromide, or iodide; the McConville catalyst, which has the structure:

wherein M is titanium or zirconium. Iron (II) and cobalt (II) complexes with 2,6-bis(imino) pyridyl ligands, which have the structure:

where M is the metal, and R is hydrogen, alkyl, or hydrocarbyl. Titanium or zirconium complexes with pyrroles as ligands also serve as single-site catalysts. These complexes have the structure:

where M is the metal atom, m and n are independently 1 to 4, and indicate the number of substituent groups attached to the aromatic rings, $R_m$ and $R_n$ are independently hydrogen or alkyl, and X is halide or alkyl. Other examples include diimide complexes of nickel and palladium, which have the structure:

where Ar is aromatic, M is the metal, and X is halide or alkyl. Boratabenzene complexes of the Group 4 or 5 metals also function as single-site catalysts. These complexes have the structure:

and

-continued where B is boron, and M is the metal atom.

As used herein, the term "single-site catalyzed polymer" refers to any polymer, copolymer, or terpolymer, and, in particular, any polyolefin, polymerized using a single-site catalyst, which include, but are not limited to, those catalysts described above and metallocene catalysts. The term "non-metallocene single-site catalyzed polymer" refers to any polymer, copolymer, or terpolymer, and, in particular, any polyolefin, polymerized using a single-site catalyst other than a metallocene catalyst. The catalysts discussed above are examples of non-metallocene single-site catalysts. The term "metallocene catalyzed polymer" refers to any polymer, copolymer, or terpolymer, and, in particular, any polyolefin, polymerized using a metallocene catalyst.

As used herein, the term "single-site catalyzed polymer blend" refers to any blend of a single-site catalyzed polymer and any other type of polymer, preferably an ionomer, as well as any blend of a single-site catalyzed polymer with another single-site catalyzed polymer, including, but not limited to, a metallocene catalyzed polymer.

The terms "grafted single-site catalyzed polymer" and "grafted single-site catalyzed polymer blend" refer to any single-site catalyzed polymer or single-site catalyzed polymer blend in which the single-site catalyzed polymer has been subjected to a post-polymerization reaction to graft at least one functional group onto the single-site catalyzed polymer. A "post-polymerization reaction" is any reaction that occurs after the formation of the polymer by a polymerization reaction.

As used herein, the term "layer" includes any generally spherical portion of a golf ball or golf ball core, center, or mantle, including one-piece cores and one-piece balls. A "mantle" or "intermediate layer" is defined herein as a portion of the golf ball that occupies a volume between the cover and the core. Of course, as one of ordinary skill in the art would recognize, any of the core, cover, and mantle of the golf balls of the invention can be formed of one layer or a plurality of layers, as that term is defined herein.

In addition, as used herein, the term "compatible" with regard to a polymer blend refers to a blend of two or more polymers, having useful golf ball properties, that is homogeneous on a macroscopic scale. Compatible blends may be miscible, i.e., homogeneous on a microscopic scale, or at least partially immiscible, i.e., heterogeneous on a microscopic scale. The term "incompatible" refers to a mixture of at least two polymers that is heterogeneous on both a microscopic scale and a macroscopic scale, such that useful golf ball properties, such as durability, are lacking.

The present invention relates to golf balls including at least one foamed or unfoamed layer that comprises one or more single-site catalyzed polymers, any of which may be functionalized. As noted above, the layer may be in any of the core, the cover, or a mantle layer situated between the cover and the core. The single-site catalyzed polymer, which may be grafted, and may also be blended with polymers, such as non-grafted single-site catalyzed polymers, grafted single-site catalyzed polymers, ionomers, and thermoplastic elastomers. Preferably, the single-site catalyzed polymer is blended with at least one ionomer.

Single-site catalyzed polymers and polymer blends may be foamed during molding by any conventional foaming or blowing agent. Grafted single-site catalyzed polymers may be foamed in the same manner. Single-site catalyzed polymers, whether or not grafted, and polymer blends may be thermoformed, and, thus, can be either compression or injection molded to form a layer of foamed or unfoamed, grafted or non-grafted, single-site catalyzed polymer in the cover, core, and/or mantle of a golf ball according to the invention. Single-site catalyzed polymers and polymer blends of such polymers are resilient, easily processed materials that are often less expensive than ionomers, and allow highly durable golf balls to be produced with improved performance and virtually any combination of feel and spin rate.

As noted above, golf balls according to the invention may incorporate cores comprising single-site catalyzed polymers or polymer blends, grafted single-site catalyzed polymers or polymer blends, or conventional materials. Cores comprising at least one single-site catalyzed polymer or polymer blend, may be either one-piece, formed of a unitary mass of foamed or unfoamed single-site catalyzed polymer or polymer blend, or multi-piece, comprising a gas filled, liquid filled, hollow, or solid core or center and one or more layers surrounding the core or center in which any of the center or at least one of the layers comprises a foamed or unfoamed single-site catalyzed polymer or polymer blend. The core may instead comprise a grafted single-site catalyzed polymer.

Figure 1:
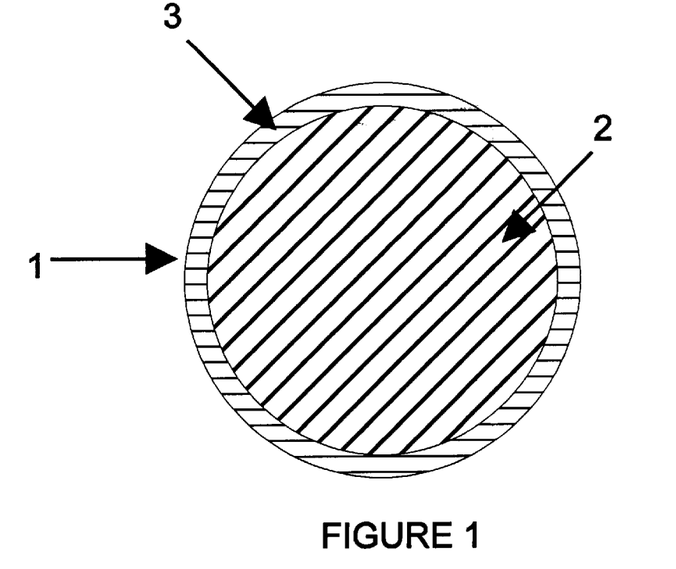
FIG. 1 is a cross-sectional view of a two-piece golf ball according to the invention with a one-piece core.

For example, FIG. 1 illustrates a golf ball according to the invention with a one-piece core. Golf ball 1 comprises a core 2 and a cover 3, wherein either of core 2 or cover 3 incorporates at least one layer comprising a foamed or unfoamed, grafted or non-grafted, single-site catalyzed polymer or polymer blend.

Figure 2:
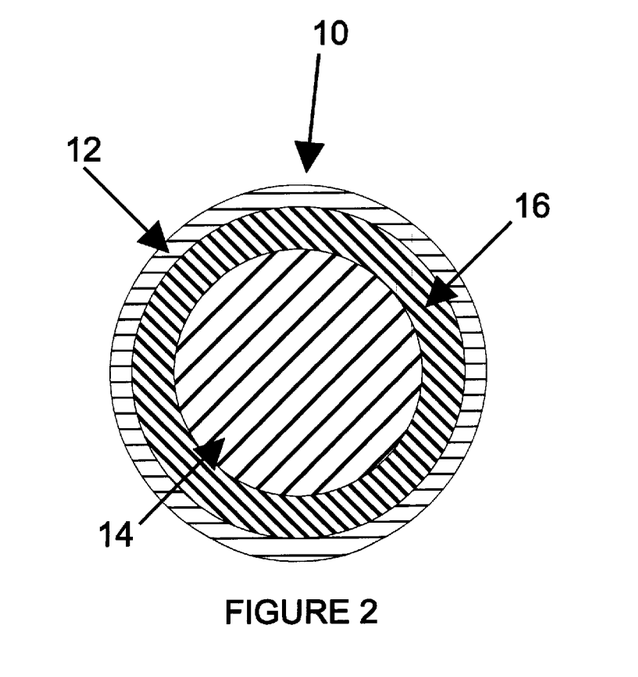
FIG. 2 is a cross-sectional view of a golf ball according to the invention incorporating a dual core.

Similarly, FIG. 2 illustrates a golf ball according to the invention incorporating a multi-piece core. Golf ball 10 comprises a cover 12, a core having a center 14 and at least one additional core layer 16. Any of the cover 12, center 14, or core layer 16 may incorporate at least one layer of a foamed or unfoamed, grafted or non-grafted, single-site catalyzed polymer or polymer blend.

Conventional materials useful in centers, cores, or core layers of the golf balls of the invention include, but are not limited to, compositions having a base rubber, a crosslinking agent, and a filler. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. Crosslinking agents include metal salts of unsaturated fatty acids, such as zinc or magnesium salts of acrylic or methacrylic acid. The filler typically includes materials such as zinc oxide, barium sulfate, silica, calcium carbonate, zinc carbonate, metal, glass spheres, and the like. Golf balls of the invention may also have conventional wound cores.

Figure 3:
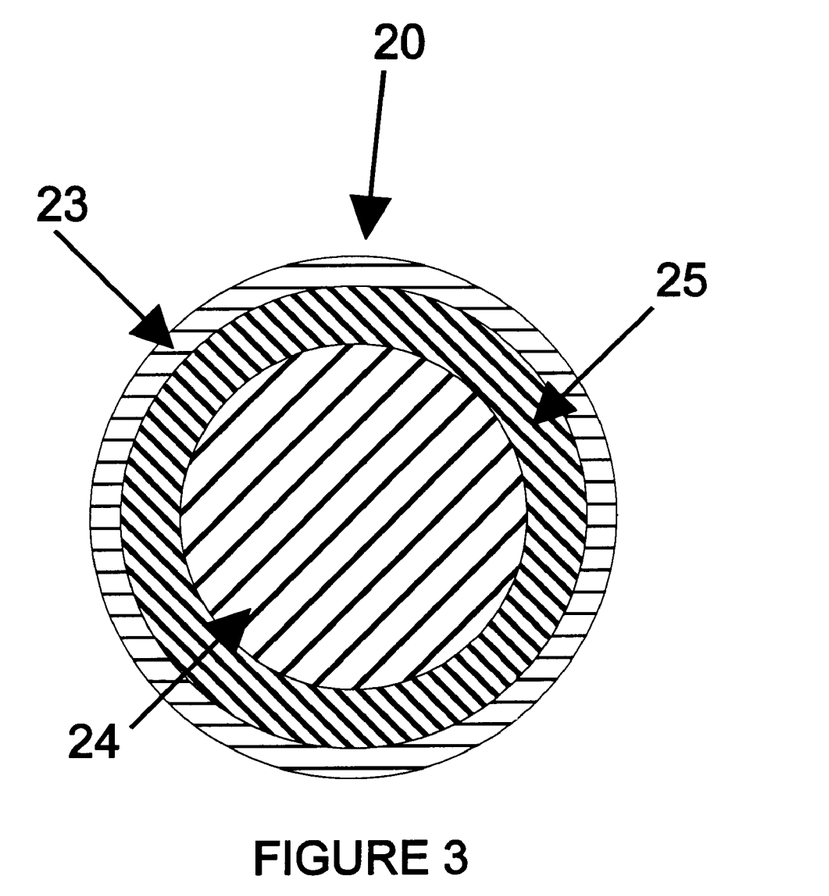
FIG. 3 is a cross-sectional view of a golf ball according to the invention incorporating a mantle layer between the cover and the core.

Golf balls of the invention may also include a mantle layer situated between the cover and the core. Preferably, the mantle layer comprises a least one layer of a foamed or unfoamed, grafted or non-grafted, single-site catalyzed polymer or polymer blend, but may also be formed from any other suitable polymeric material having the desired properties. A golf ball incorporating a mantle layer is illustrated in FIG. 3, which depicts golf ball 20, having cover 23, core 24, and a mantle layer 25 situated between the cover and the core. Any of cover 23, core 24, and mantle layer 25 may incorporate at least one layer of a foamed or unfoamed, grafted or non-grafted, single-site catalyzed polymer or polymer blend. Moreover, core 24 may be a one-piece core, a multi-layer core, or a wound core, having a solid, gas filled, liquid filled, or hollow center.

Golf balls according to the invention may also incorporate cover layers comprising foamed or unfoamed, grafted or non-grafted, single-site catalyzed polymers or polymer blends, or conventional materials, including balata and ionomer cover stock. Grafted or non-grafted single-site catalyzed polymer or polymer blend cover layers according to the invention may be used with conventional solid or wound cores, as well as with cores comprising grafted or non-grafted single-site catalyzed polymers or polymer blends. Preferably, the cover of a golf ball according to the invention is formed from a blend comprising at least one single-site catalyzed polymer, grafted or non-grafted, and at least one ionomer.

The narrow molecular weight distributions of single-site catalyzed polymers provide more uniform compositions and improved mechanical properties when compared to polyolefins polymerized with conventional catalysts. In addition, when the single-site catalyzed polymer is modified by a post-polymerization reaction to add at least one pendant functional group to the single-site catalyzed polymer, the compatibility of the resulting grafted single-site catalyzed polymer with other polymers, and with ionomers in particular, is even further improved. As a result, as with non-grafted single-site catalyzed polymers, blends of grafted single-site catalyzed polymers and ionomers also have superior golf ball properties, including performance and durability.

The use of foamed grafted single-site catalyzed polymer also allows the golf ball designer to adjust the density or mass distribution of the ball to adjust the angular moment of inertia, and, thus, the spin rate and performance of the ball. Foamed materials also offer a potential cost savings due to the reduced use of polymeric material.

Grafted single-site catalyzed polymers useful in the golf balls of the invention may be obtained by subjecting a non-grafted single-site catalyzed polymer to a post-polymerization reaction to provide a grafted single-site catalyzed polymer with the desired pendant group or groups. Examples of single-site catalyzed polymers to which functional groups may be grafted for use in the invention include, but are not limited to, homopolymers of ethylene and propylene and copolymers of ethylene and a second olefin, preferably, propylene, butene, pentene, hexene, heptene, octene, and norbornene, and most preferably, butene, pentene, hexene, heptene, octene, and norbornene. Generally, this embodiment of the invention includes golf balls having at least one layer comprising at least one grafted single-site catalyzed polymer or polymer blend, where the grafted single-site catalyzed polymer is produced by grafting a functional group onto a single-site catalyzed polymer having the formula:

wherein $R_1$ is hydrogen, branched or straight chain alkyl such as methyl, ethyl, propyl, butyl, pentyl, hexyl, heptyl, and octyl, carbocyclic, aromatic or heterocyclic;

$R_2$ is hydrogen, lower alkyl including $C_1-C_5$; carbocyclic, aromatic or heterocyclic $R_3$ is hydrogen, lower alkyl including $C_1-C_5$, carbocyclic, aromatic or heterocyclic;

$R_4$ is selected from the group consisting of H, $C_nH_{2n+1}$, where n=1 to 18, and phenyl, in which from 0 to 5 H within $R_4$ can be replaced by substituents selected from the group consisting of COOH, $SO_3H$, $NH_2$, F, Cl, Br, I, OH, SH, epoxy, isocyanate, silicone, lower alkyl esters and lower alkyl ethers, with the proviso that $R_3$ and $R_4$ can be combined to form a bicyclic ring;

$R_5$ is hydrogen, lower alkyl including $C_1-C_5$, carbocyclic, aromatic or heterocyclic;

$R_6$ is hydrogen, lower alkyl including $C_1-C_5$, carbocyclic, aromatic or heterocyclic; and wherein x, y and z are the relative percentages of each co-monomer. The number x can range from 1 to 100 percent or more preferably from 1 to 70 percent and most preferred, from about 1 to 50 percent. The number y can be from 99 to 0 percent, preferably, from 9 to 30 percent, or most preferably, 9 to 50 percent. The number z can range from 0 to 50 percent.

The preferred grafted single-site catalyzed polymer may be formed by grafting a functional group onto a single-site catalyzed polyethylene or a single-site catalyzed polymer of the formula given above in which $R_1$ is hydrogen or lower alkenyl, $R_2$ is hydrogen or alkyl, including carbon chains having from 1 to 10 carbon atoms, $R_3$ is hydrogen or lower alkyl or alkenyl such as carbon chains having 1–10 carbon atoms, and $R_4$ is a lower alkyl group having from 1–10 carbon atoms. For terpolymers, where z is not zero, $R_5$ is preferably hydrogen or lower alkyl or alkenyl such as carbon chains having 1–10 carbon atoms, and $R_6$ is a lower alkyl group having from 1–10 carbon atoms. In the most preferred copolymer, $R_1$ and $R_2$ are hydrogen, $R_3$ is hydrogen, methyl, ethyl, propyl, butyl, pentyl, hexyl, heptyl or octyl, and $R_4$ is a straight carbon chain having 6 carbon atoms. For terpolymers, $R_5$ is most preferably hydrogen, methyl, ethyl, propyl, butyl, pentyl, hexyl, heptyl or octyl, and $R_6$ is a straight carbon chain having 6 carbon atoms.

Single-site catalyzed copolymers or terpolymers can be random or block copolymers or terpolymers, and may be isotactic, syndotactic or atactic. The pendant groups creating the isotactic, syndiotactic or atactic polymers are chosen to determine the interactions between the different polymer chains making up the resin to control the final properties of the resins used in golf ball covers, cores, or mantles. As will be clear to those skilled in the art, grafted single-site catalyzed polymers useful in the invention that are formed from single-site catalyzed random or block copolymers or terpolymers will also be random or block copolymers or terpolymers, and will have the same tacticity of the single-site catalyzed polymer backbone.

As used herein, the phrase branched or straight chain alkyl means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, pentene, hexene, heptene, octene, norbornene, nonene, decene and the like. The ordinary skilled artisan is familiar with numerous linear and branched alkyl groups, which are within the scope of the present invention.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, substituted and unsubstituted carbocyclic means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, substituted and unsubstituted aryl groups means a hydrocarbon ring bearing a system of conjugated double bonds, typically comprising 4n+2π(pi) ring electrons, where n is an integer. Examples of aryl groups include, but are not limited to phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl.

Monomers useful in the present invention include, but are not limited to olefinic monomers having, as a functional group, sulfonic acid, sulfonic acid derivatives, such as chlorosulfonic acid, vinyl ethers, vinyl esters, primary, secondary, and tertiary amines, epoxies, isocyanates, monocarboxylic acids, dicarboxylic acids, partially or fully ester derivatized mono-carboxylic acids and dicarboxylic acids, and anhydrides of dicarboxylic acids, and cyclic imides of dicarboxylic acids. In polyethylene, the post-polymerization reaction results in the substitution of the monomer for a hydrogen on the polymer backbone. Because all of the secondary hydrogen atoms are equivalent in polyethylene, the pendant group may replace any of the secondary hydrogens on the polymer. In copolymers and polymers of olefins other than ethylene, which contain both secondary and tertiary hydrogens, the tertiary hydrogens are more labile, and, thus, the reaction occurs substantially exclusively at the site of the tertiary hydrogens.

In addition, single-site catalyzed polymers may also be functionalized by sulfonation, carboxylation, or the addition of an amine or hydroxy group. Single-site catalyzed polymers functionalized by sulfonation, carboxylation, or the addition of a hydroxy group may be converted to anionic ionomers by treatment with a base. Similarly, single-site catalyzed polymers functionalized by the addition of an amine may be converted to cationic ionomers by treatment with an alkyl halide, acid, or acid derivative.

The most preferred monomer is maleic anhydride, which, once attached to the single-site catalyzed polymer by the post-polymerization reaction, may be further subjected to any reaction to which an anhydride may be subject to form a grafted single-site catalyzed polymer containing other pendant or functional groups. For example, reaction with water will convert the anhydride to a dicarboxylic acid, reaction with ammonia forms an amide, reaction with an alcohol results in the formation of an ester, and reaction with base results in the formation of an anionic ionomer.

In particular, maleic anhydride, which has the formula may be grafted onto a single-site catalyzed polymer by means of a post-polymerization reaction, as described above. The maleic anhydride will graft onto a single-site catalyzed polymer of formula to form a grafted single-site catalyzed polymer of formula where R may be hydrogen, or lower alkyl, i.e., typically, $C_1$ to about $C_{12}$ alkyl. Where R is not H, the monomer being grafted to the single-site catalyzed polymer will always replace the tertiary H because the tertiary H is more labile than the secondary H. Clearly, in polyethylene, where every H is a secondary H, the monomer must replace a secondary H. Where the monomer is a maleic anhydride, the resulting grafted single-site catalyzed polymer may be reacted with water to form which may be further reacted with a base of formula $M^+OH^-$, and where M is $Li^+$, $Na^+$, $Zn^{++}$, $Ca^{++}$, $Mg^{++}$, $W^{+3}$,

$W^{+5}$, $Ti^{+2}$, or $Ti^+$, to form an ionomer of formula formula or formula or reacted with a base of formula $M^{n+}(OH^-)_n$, where M may be $Zn^{++}$, $Ca^{++}$, $Mg^{++}$, $W^{3+}$, $W^{5+}$, $Ti^{2+}$, or $Ti^+$, to form an ionomer, e.g., of formula A maleic anhydride grafted single-site catalyzed polymer may also be reacted with ammonia to form It has been discovered that maleic anhydride grafted single-site catalyzed polymers form highly compatible blends with ionomers and other thermoplastic polymers.

In addition, unsaturated carboxylic acids, such as methacrylic and acrylic acid, can be grafted to a single-site catalyzed polymer to form which may be reacted with a base to form an ionomer, where R is hydrogen or methyl. Sulfur compounds, such as $H_2SO_4$, $ClSO_3H$, or $SO_3$, when grafted to a single-site catalyzed polymer will form polymers of formula Grafting a vinyl ester of formula $CH_2=CH-COOR$ gives polymers of formula and a primary or secondary amine or other suitable nitrogen compound provides polymers of formula where R is as defined above, and $R_1$ and $R_2$ may be hydrogen, or lower alkyl, i.e., typically, $C_1$ to about $C_{12}$ alkyl.

If a monomer of formula is used, the resulting grafted single-site catalyzed polymer of formula may be reacted with an acid or acid derivative or a compound of formula $R^+X^-$, where R may be a linear or branched alkyl group having from 1 to 12 carbon atoms, and X may be a halide, to form a cationic ionomer.

The preferred single-site catalyzed polymer blend golf ball compositions of the present invention comprise compatible blends of at least one grafted or non-grafted single-site catalyzed polymer and at least one ionomer or other thermoplastic elastomer. Blends useful in the golf ball of the invention may be formed using blending methods well known in the art.

The single-site catalyzed polymers useful in the golf balls of the invention can also be blended with non-grafted single-site catalyzed polymers and other non-ionomeric polymers, such as poly(ethylethylene), poly(heptylethylene), poly(hexyldecylethylene), poly(isopentylethylene), poly(1,1-dimethyltrimethylene), poly(1,1,2-trimethyltrimethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly[1,1-bis(trifluoromethoxy)difluoroethylene], poly(methoxyethylene), poly(pentyloxyethylene), poly(1,1-dichloroethylene), poly(cyclopentylacetoxyethylene), poly(4-[(2-butoxyethoxy)methyl]styrene), poly(4-dodecylstyrene), poly(4-tetradecylstyrene), poly[oxy(allyloxymethyl)ethylene], poly[oxy(ethoxymethyl)ethylene], poly(oxyethylethylene), poly(oxytetramethylene), poly(oxytrimethylene), poly(oxycarbonylpentamethylene), poly(oxycarbonyl-3-methylpentamethylene), poly(oxycarbonyl-1,5-dimethylpentamethylene), Polysilicones, polysiloxanes, polytrimethylene terephthalate, poly(silanes) and poly(silazanes), oxa acids, saponified polymers, main-chain heterocyclic polymers, polyamides, polyimides, polyesters, polyethers, polycarbonates, and poly(furan tetracarboxylic acid diimides) as well as the classes of polymers to which they belong.

The amounts of polymers used in the golf ball compositions of the invention can vary from 1 to 100 phr of the single-site catalyzed polymers to 99 to 0 phr of other polymers or ionomers, preferably, 5 to 75 phr single-site catalyzed polymers and 95 to 25 phr ionomer or other polymer. Most preferred is from about 10 to 50 phr single-site catalyzed polymer and from about 90 to 50 phr of other polymer or ionomer. The same amounts are applicable when the single-site polymer has been functionalized.

Additional compositions may be added to the polymers and compatible polymer blends of the invention, such as, for example, coloring agents, reaction enhancers, crosslinking agents, dyes, lubricants, fillers, including density increasing and density decreasing fillers, excipients, process aids and other compounds commonly added to polymeric materials and/or golf ball covers.

The present invention relates to golf balls of any size. While USGA specifications limit the size of a competition golf ball to more than 1.68 inches (4.27 cm) in diameter, golf balls of any size can be used for leisure golf play. The preferred diameter of the golf balls is from about 1.68 inches to about 1.8 inches (4.57 cm). The more preferred diameter is from about 1.68 inches to about 1.76 inches (4.47 cm). A diameter of from about 1.68 inches to about 1.74 inches (4.42 cm) is most preferred.

Grafted or non-grafted single-site catalyzed polymer or polymer blend layers may be produced in golf balls in accordance with the present invention by injection molding or compression molding a layer of grafted or non-grafted single-site catalyzed polymer or polymer blend material about a previously formed center or core, cover, or mantle layer. Cores comprising a grafted or non-grafted single-site catalyzed polymer or polymer blend may also be formed directly by injection molding or compression molding. When the layer or core is injection molded, a physical or chemical blowing or foaming agent may be included to produce a foamed layer. Blowing or foaming agents useful in forming foamed, grafted and non-grafted, single-site catalyzed polymer or polymer blends include, but are not limited to organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the blend during the injection molding process.

In a further embodiment, foamed, grafted or non-grafted, single-site catalyzed polymer or polymer blends may be formed by blending microspheres with the grafted or non-grafted single-site catalyzed polymer blend either during or before the molding process. Polymeric, ceramic, metal, and glass microspheres are useful in the invention, and may be solid or hollow and filled or unfilled. Microspheres up to about 1,000 micrometers in diameter are useful in the single-site catalyzed polymer blends of the invention.

For compression molded grafted or non-grafted single-site catalyzed polymer blend layers, half-shells may be made by injection molding a grafted or non-grafted single-site catalyzed polymer blend in a conventional half-shell mold or by compression molding sheets of foamed grafted or non-grafted single-site catalyzed polymer. The half-shells are placed about a previously formed center or core, cover, or mantle layer, and the assembly is introduced into a compression molding machine, and compression molded at about 250 to 400° F. The molded balls are then cooled while still in the mold, and finally removed when the layer of grafted or non-grafted single-site catalyzed polymer blend is hard enough to be handled without deforming. Additional core, mantle, and cover layers are then molded onto the previously molded layers, as needed, until a complete ball is formed.

After the final cover layer of the ball has been molded, the ball undergoes various conventional finishing operations such as buffing, painting and stamping.

Blending of the grafted or non-grafted single-site catalyzed polymer and ionomer resins is accomplished in a conventional manner using conventional equipment. Good results have been obtained by mixing the single-site catalyzed polymer, whether or not grafted, and ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding or for molding flowable grafted or non-grafted single-site catalyzed polymer blend using a retractable-pin mold. Such machines are conventional.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

We claim:

1. A golf ball comprising a cover having a thickness of at least about 0.03 inch and at least about 60 percent dimple coverage, a core having a PGA compression of at least about 40, and, optionally, a mantle situated between the cover and the core, wherein at least one of the cover, the core, and the mantle comprises at least one layer formed of a single-site catalyzed polymer blend comprising from about 1 to about 100 phr of at least one non-metallocene single-site catalyzed polymer having a hardness of at least about 15 Shore A, a flexural modulus of at least about 500 psi, a specific gravity of at least about 0.7, a dynamic shear storage modulus at 23° C. of at least about 104 dynes/Cm², and a loss tangent of no more than about 1, and from about 99 to 0 phr of at least one ionomer, non-ionomeric polymer, thermoset polymer, thermoplastic, or non-single-site catalyzed polymer, having a flexural modulus of at least about 500 psi, wherein the golf ball has a PGA compression of at least about 50.

2. The golf ball of claim 1, wherein the cover has a thickness of from about 0.03 to about 0.125 inch and at least about 70 percent dimple coverage; the core has a diameter of from about 0.5 to about 1.6 inches and a PGA compression of from about 40 to about 90; and the ball has a PGA compression of from about 60 to about 120.

3. The golf ball of claim 1, wherein at least one layer in at least one of the cover, the core, or the mantle further comprises a density adjusting filler material.

4. The golf ball of claim 1, wherein the layer forms at least a portion of the cover, and the cover has a hardness of from about 40 to about 70 Shore D.

5. The golf ball of claim 1, wherein the layer forms at least a portion of the core.

6. The golf ball of claim 1, wherein the core is a wound core, having a solid, gas filled, liquid filled, or hollow center, and the center has a diameter of at least about 0.5 inch.

7. The golf ball of claim 1, wherein the mantle layer is present, and the mantle layer has a thickness of at least about 0.02 inch, and the core has a diameter of less than about 1.6 inches.

8. The golf ball of claim 7, wherein the mantle is formed from a wound elastomeric layer.

9. The golf ball of claim 7, wherein the layer forms at least a portion of the mantle, and the mantle layer has a thickness of from about 0.02 to about 0.125 inch and a hardness of at least about 15 Shore D.

10. The golf ball of claim 1, wherein at least one of the cover, the core, or the optional mantle has a foamed structure.

11. A golf ball having at least one layer, wherein said layer comprises at least one non-metallocene single-site catalyzed polymer having a hardness of at least about 15 Shore A, a flexural modulus of at least about 500 psi, a specific gravity of at least about 0.7, a dynamic shear storage modulus at 23° C. of at least about 104 dynes/cm², and a loss tangent of no more than about 1.

12. The golf ball of claim 11, wherein the single-site catalyzed polymer has a hardness of from about 50 Shore A to about 80 Shore D, a flexural modulus of from about 1,000 to about 100,000 psi, a specific gravity of from about 0.75 to about 1, a dynamic shear storage modulus at 23° C. of about $10^6$ to about $10^{10}$ dynes/cm², and a loss tangent of no more than about 0.1.

13. The golf ball of claim 11, further comprising at least one of an ionomer, a non-ionomeric polymer, a thermoset polymer, a thermoplastic, or a non-single-site polymer, having a flexural modulus of at least about 500 psi blended with the at least one single-site catalyzed polymer.

14. The golf ball of claim 11, wherein the layer further comprises at least one of a density increasing filler or a density decreasing filler.

15. The golf ball of claim 11, wherein the layer has a foamed structure.

16. The golf ball of claim 11, comprising a cover, a core, and, optionally, a mantle layer situated between the cover and the core, wherein the layer forms at least a portion of at least one of the cover, the core, or the mantle.

17. The golf ball of claim 16, wherein the core comprises a gas filled, liquid filled, solid, or hollow center.

18. The golf ball of claim 11, wherein the at least one layer of the golf ball is formed from a composition comprising at least one single-site catalyzed polymer that has been functionalized by sulfonation, carboxylation, addition of an amine or hydroxy, or by grafting an ethylenically unsaturated monomer onto the at least one single-site catalyzed polymer using a post-polymerization reaction.

19. The golf ball of claim 18, wherein the ethylenically unsaturated monomer is an olefinic monomer having a functional group selected from the group consisting of sulfonic acid, sulfonic acid derivatives, chlorosulfonic acid, vinyl ethers, vinyl esters, primary amines, secondary amines, tertiary amines, epoxies, isocyanates, monocarboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, epoxies, isocyanates, and ionomeric derivatives thereof.

20. The golf ball of claim 18, wherein the ethylenically unsaturated monomer is maleic anhydride.

21. The golf ball of claim 11, wherein the single-site catalyzed polymer is of the formula:

wherein $R_1$ is hydrogen;

$R_2$ is hydrogen or lower alkyl selected from the group consisting of $CH_3$, $C_2H_5$, $C_3H_7$, $C_4H_9$, and $C_5H_{11}$;

$R_3$ is hydrogen or lower alkyl selected from the group consisting of $CH^3$, $C_2H_5$, $C_3H_7$, $C_4H_9$, and $C_5H_{11}$;

$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, $NH_2$, F, Cl, Br, I, OH, SH, epoxy, isocyanate, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x ranges from 100 to 50 weight per cent of the polymer, y ranges from 0 to 50 weight per cent of the polymer and z ranges from 0 to 49 weight per cent of the polymer.

22. The golf ball of claim 21, wherein the single-site catalyzed polymer is a grafted single-site catalyzed polymer comprising an ethylenically unsaturated monomer grafted onto the single-site catalyzed polymer.

23. The golf ball of claim 22, wherein the ethylenically unsaturated monomer is an olefinic monomer having a functional group selected from the group consisting of sulfonic acid, sulfonic acid derivatives, chlorosulfonic acid, vinyl ethers, vinyl esters, primary amines, secondary amines, tertiary amines, epoxies, isocyanates, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, and ionomeric derivatives thereof.

24. The golf ball of claim 23, wherein the ethylenically unsaturated monomer is maleic anhydride.

25. A golf ball comprising a cover, a core, and a mantle situated between the cover and the core, wherein at least one of the cover, the core, and the mantle comprises at least one layer formed of a single-site catalyzed polymer blend comprising from about 1 to about 100 phr of at least one non-metallocene single-site catalyzed polymer having a hardness of at least about 15 Shore A, a flexural modulus of at least about 500 psi, and a specific gravity of at least about 0.7, a dynamic shear storage modulus at 23° C. of at least about 104 dynes/cm$^2$, a loss tangent of no more than about 1, and from about 99 to 0 phr of at least one ionomer having a flexural modulus of at least about 500 psi.

26. The golf ball of claim 25, wherein the layer has a foamed structure.

27. The golf ball of claim 25, wherein the single-site catalyzed polymer is of the formula:

wherein $R_1$ is hydrogen;

$R_2$ is hydrogen or lower alkyl selected from the group consisting of $CH_3$, $C_2H_5$, $C_3H_7$, $C_4H_9$, and $C_5H_{11}$;

$R_3$ is hydrogen or lower alkyl selected from the group consisting of $CH_3$, $C_2H_5$, $C_3H_7$, $C_4H_9$, and $C_5H_{11}$;

$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, $NH_2$, F, Cl, Br, I, OH, SH, epoxy, isocyanate, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x ranges from 100 to 50 weight per cent of the polymer, y ranges from 0 to 50 weight per cent of the polymer and z ranges from 0 to 49 weight per cent of the polymer.

28. The golf ball of claim 25, wherein at least one of the cover, the core and the mantle comprises at least one layer, the layer formed from a composition comprising at least one single-site catalyzed polymer that has been functionalized by sulfonation, carboxylation, addition of an amine or hydroxy, or by grafting an ethylenically unsaturated monomer onto the single-site catalyzed polymer using a post-polymerization reaction.

29. The golf ball of claim 28, wherein the ethylenically unsaturated monomer is maleic anhydride.

30. The golf ball of claim 28, wherein the layer comprises the functionalized single-site catalyzed polymer has a foamed structure.

31. The golf ball of claim 29, wherein the ethylenically unsaturated monomer is an olefinic monomer having a functional group selected from the group consisting of sulfonic acid, sulfonic acid derivatives, chlorosulfonic acid, vinyl ethers, vinyl esters, primary amines, secondary amines, tertiary amines, epoxies, isocyanates, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, and ionomeric derivatives thereof.

32. The golf ball of claim 25, wherein the layer further comprises at least one of a density increasing filler or a density decreasing filler.

33. A golf ball comprising a cover having a thickness of at least about 0.03 inch and at least about 60 percent dimple coverage, a core having a PGA compression of at least about 40, and, optionally, a mantle situated between the cover and the core, wherein at least one of the cover, the core, and the mantle comprises at least one layer, the layer formed of a single-site catalyzed polymer blend, comprising from about 1 to about 100 phr of at least one single-site catalyzed polymer that has been functionalized by grafting an ethylenically unsaturated monomer thereon using a post-polymerization reaction and that has a hardness of at least about 15 Shore A, a flexural modulus of at least about 500 psi, a specific gravity of at least about 0.7, a dynamic shear storage modulus at 23° C. of at least about 104 dynes/cm$^2$, and a loss tangent of no more than about 1, and from about 99 to 0 phr of at least one ionomer, non-ionomeric polymer, thermoset polymer, thermoplastic, or non-single-site catalyzed polymer, having a flexural modulus of at least about 500 psi, wherein the golf ball has a PGA compression of at least about 50.

34. The golf ball of claim 33, wherein the cover has a thickness of from about 0.03 to about 0.125 inch and at least about 70 percent dimple coverage; the core has a diameter of from about 0.5 to about 1.6 inches and a PGA compression of from about 40 to about 90; and the ball has a PGA compression of from about 60 to about 120.

35. The golf ball of claim 33, wherein at least one layer in at least one of the cover, the core, or the mantle further comprises a density adjusting filler material.

36. The golf ball of claim 33, wherein the layer forms at least a portion of the cover, and the cover has a hardness of from about 40 to about 70 Shore D.

37. The golf ball of claim 33, wherein the layer forms at least a portion of the core.

38. The golf ball of claim 33, wherein the core is a wound core, having a solid, gas filled, liquid filled, or hollow center, and the center has a diameter of at least about 0.5.

39. The golf ball of claim 33, wherein the mantle layer is present, and the mantle layer has a thickness of at least about 0.02 inch, and the core has a diameter of less than about 1.6 inches.

40. The golf ball of claim 39, wherein the mantle is formed from a wound elastomeric layer.

41. The golf ball of claim 39, wherein the layer forms at least a portion of the mantle, and the mantle layer has a thickness of from about 0.02 to about 0.125 inch and a hardness of at least about 15 Shore D.

42. The golf ball of claim 33, wherein at least one of the cover, the core, or the optional mantle has a foamed structure.

43. A golf ball having at least one layer, wherein said layer comprises at least one single-site catalyzed polymer that has been functionalized by grafting an ethylenically unsaturated monomer thereon using a post-polymerization reaction having a hardness of at least about 15 Shore A, a flexural modulus of at least about 500 psi, a specific gravity of at least about 0.7, a dynamic shear storage modulus at 23 C. of at least about 104 dynes/cm$^2$, and a loss tangent of no more than about 1.

44. The golf ball of claim 43, wherein the single-site catalyzed polymer has a hardness of from about 50 Shore A to about 80 Shore D, a flexural modulus of from about 1,000 to about 100,000 psi, a specific gravity of from about 0.75 to about 1, a dynamic shear storage modulus at 23 C. of about 106 to about 1010 dynes/cm$^2$, and a loss tangent of no more than about 0.1.

45. The golf ball of claim 43, further comprising at least one of an ionomer, a non-ionomeric polymer, a thermoset polymer, a thermoplastic, or a non-single-site polymer, having a flexural modulus of at least about 500 psi blended with the at least one single-site catalyzed polymer.

46. The golf ball of claim 43, wherein the layer further comprises at least one of a density increasing filler or a density decreasing filler.

47. The golf ball of claim 43, wherein the layer has a foamed structure.

48. The golf ball of claim 43, comprising a cover, a core, and, optionally, a mantle layer situated between the cover and the core, wherein the layer forms at least a portion of at least one of the cover, the core, or the mantle.

49. The golf ball of claim 48, wherein the core comprises a gas filled, liquid filled, solid, or hollow center.

50. The golf ball of claim 43, wherein the single-site catalyzed polymer is a non-metallocene single-site catalyzed polymer.

51. The golf ball of claim 43, wherein the at least one layer of the golf ball is formed from a composition comprising at least one single-site catalyzed polymer that has been functionalized by sulfonation, carboxylation, or addition of an amine or hydroxy using a post-polymerization reaction.

52. The golf ball of claim 43, wherein the ethylenically unsaturated monomer is an olefinic monomer having a functional group selected from the group consisting of sulfonic acid, sulfonic acid derivatives, chlorosulfonic acid, vinyl ethers, vinyl esters, primary amines, secondary amines, tertiary amines, epoxies, isocyanates, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, epoxies, isocyanates, and ionomeric derivatives thereof.

53. The golf ball of claim 43, wherein the ethylenically unsaturated monomer is maleic anhydride.

54. The golf ball of claim 43, wherein the single-site catalyzed polymer is a non-metallocene single-site catalyzed polymer.

55. The golf ball of claim 43, wherein the single-site catalyzed polymer is of the formula:

wherein $R_1$ is hydrogen;

$R_2$ is hydrogen or lower alkyl selected from the group consisting of $CH_3$, $C_2H_5$, $C_3H_7$, $C_4H_9$, and $C_5H_{11}$;

$R_3$ is hydrogen or lower alkyl selected from the group consisting of $CH_3$, $C_2H_5$, $C_3H_7$, $C_4H_9$, and $C_5H_{11}$;

$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, NH2, F, Cl, Br, I, OH, SH, epoxy, isocyanate, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x ranges from 100 to 50 weight per cent of the polymer, y ranges from 0 to 50 weight percent of the polymer and z ranges from 0 to 49 weight per cent of the polymer.

56. The golf ball of claim 55, wherein the ethylenically unsaturated monomer is an olefinic monomer having a functional group selected from the group consisting of sulfonic acid, sulfonic acid derivatives, chlorosulfonic acid, vinyl ethers, vinyl esters, primary amines, secondary amines, tertiary amines, epoxies, isocyanates, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, and ionomeric derivatives thereof.

57. The golf ball of claim 56, wherein the ethylenically unsaturated monomer is maleic anhydride.

58. The golf ball of claim 56, wherein the single-site catalyzed polymer is a non-metallocene single-site catalyzed polymer.

59. A golf ball comprising a cover, a core, and a mantle situated between the cover and the core, wherein at least one of the cover, the core, and the mantle comprises at least one layer formed of a single-site catalyzed polymer blend comprising from about 1 to about 100 phr of at least one single-site catalyzed polymer having a hardness of at least about 15 Shore A, a flexural modulus of at least about 500 psi, and a specific gravity of at least about 0.7, a dynamic shear storage modulus at 23° C. of at least about 104 dynes/cm$^2$, a loss tangent of no more than about 1, and from about 99 to 0 phr of at least one ionomer having a flexural modulus of at least about 500 psi, wherein the one single-site catalyzed polymer has been functionalized by grafting an ethylenically unsaturated monomer onto the single-site catalyzed polymer using a post-polymerization reaction.

60. The golf ball of claim 59, wherein the layer has a foamed structure.

61. The golf ball of claim 59, wherein the single-site catalyzed polymer is of the formula:

wherein $R_1$ is hydrogen;

$R_2$ is hydrogen or lower alkyl selected from the group consisting of $CH_3$, $C_2H_5$, $C_3H_7$, $C_4H_9$, and $C_5H_{11}$;

$R_3$ is hydrogen or lower alkyl selected from the group consisting of $CH_3$, $C_2H_5$, $C_3H_7$, $C_4H_9$, and $C_5H_{11}$;

$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, NH2, F, Cl, Br, I, OH, SH, epoxy, isocyanate, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x ranges from 100 to 50 weight percent of the polymer, y ranges from 0 to 50 weight percent of the polymer and z ranges from 0 to 49 weight per cent of the polymer.

62. The golf ball of claim 59, wherein at least one of the cover, the core and the mantle comprises at least one layer formed from a composition comprising at least one single-site catalyzed polymer that has been functionalized by sulfonation, carboxylation, or addition of an amine or hydroxy.

63. The golf ball of claim 59, wherein the ethylenically unsaturated monomer is maleic anhydride.

64. The golf ball of claim 59, wherein the layer comprises a foamed structure.

65. The golf ball of claim 59, wherein the ethylenically unsaturated monomer is an olefinic monomer having a functional group selected from the group consisting of sulfonic acid, sulfonic acid derivatives, chlorosulfonic acid, vinyl ethers, vinyl esters, primary amines, secondary amines, tertiary amines, epoxies, isocyanates, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, and ionomeric derivatives thereof.

66. The golf ball of claim 59, wherein the ethylenically unsaturated monomer is maleic anhydride.

67. The golf ball of claim 59, wherein the single-site catalyzed polymer is a non-metallocene single-site catalyzed polymer.

68. The golf ball of claim 59, wherein the layer further comprises at least one of a density increasing filler or a density decreasing filler.

* * * * *